March 23, 1954     J. P. MINTON     2,672,944
METHOD AND APPARATUS FOR RECORDING SEISMIC SIGNALS
Filed Nov. 4, 1948     3 Sheets-Sheet 1

John P. Minton
INVENTOR.

BY Sidney A. Johnson
ATTORNEY

John P. Minton
INVENTOR.
BY Sidney A. Johnson
ATTORNEY

March 23, 1954 J. P. MINTON 2,672,944
METHOD AND APPARATUS FOR RECORDING SEISMIC SIGNALS
Filed Nov. 4, 1948 3 Sheets-Sheet 3

John P. Minton
INVENTOR.
BY Sidney C. Johnson
ATTORNEY

Patented Mar. 23, 1954

2,672,944

UNITED STATES PATENT OFFICE 2,672,944

METHOD AND APPARATUS FOR RECORDING SEISMIC SIGNALS

John P. Minton, Dallas, Tex., assignor, by mesne assignments, to Socony-Vacuum Oil Company, Incorporated, New York, N. Y., a corporation of New York Application November 4, 1948, Serial No. 58,292

9 Claims. (Cl. 181—0.5)

This invention relates to seismic prospecting, and more particularly, to improved methods and apparatus for recording seismic waves.

In seismic prospecting elastic waves are usually initiated by detonation of an explosive charge in the near surface formations of the earth. The primary waves resulting from the explosion are propagated through the earth and are in part reflected and refracted by the various discontinuities in the formations encountered throughout the travel paths. Energy reflected from discontinuities or boundaries between subsurface formations are detected by geophones at positions spaced from and in a predetermined relation to the point of initiation.

Various systems for detecting, amplifying and recording the seismic signals are found in the seismograph art. Generally speaking, a record is produced which comprises a plurality of undulating lines, each representing the signal detected by a given geophone or a mixture of two or more such signals. Those skilled in the art interpret such records to determine therefrom such characteristics of subsurface formations as the depth and dip of the subsurface boundaries from which the energy was reflected.

A signal detected at a given geophone location, in general, is not one of simple characteristics. It is the summation of a plurality of components. The detected signal comprises the summation of the direct or refracted wave and all reflected waves reaching the geophone location at random times. In many areas, near surface formations are of such dimensions and composition that energy in a particular frequency band may persist and reverberate at relatively high amplitude through the entire observation period. As a result, reflected energy is masked or hidden by the high-amplitude noise vibrations. In order clearly to distinguish the desired impulses from the noise waves encountered, it is frequently necessary to utilize filtering schemes passing only a narrow band of frequencies which includes the desired signals and excludes the noise waves. In order to provide an amplifying-filtering circuit with the sharply selective frequency characteristics often necessary, complex circuit arrangements are required. Systems such as proposed by Rieber, Patent 2,051,153, contemplate making a phonographically reproducible record in the field which is later reproduced at a laboratory and there operated upon to emphasize the desired information to the substantial exclusion of unwanted noise signals.

In areas where reflections are not readily distinguishable from background noise, several records may be taken for each exploring location; that is, two or more separate charges are detonated and records taken following each detonation. The attenuation characteristics of the amplifying channel are varied from observation to observation substantially to cover the entire seismic band of from 30 to 80 cycles utilizing narrow band pass filters. As a result of this technique, records are obtained from which useful seismic information may be derived where otherwise a single record may be wholly inadequate.

In accordance with the present invention a plurality of records may be obtained in the field from a single shot. A signal detected by a geophone is amplified and stored on a temporary receptor. The receptor may conveniently be a magnetic wire loop. The stored signal is then, by means actuated in timed relation with the seismic signal, impressed on an amplifying-filtering circuit where it is filtered. After such impression, the original signal is removed from the temporary receptor preparatory to re-storing the signal on the receptor after the filtering step to permit successive filtering steps.

The refiltering process includes storing the signal a plurality of times on the receptor. A plurality of cycles of operations are carried out, each comprising storing the signal on the receptor, detecting the signal therefrom, and subsequently obliterating the original signal prior to the re-storing of the refiltered signal.

The signal is passed a number of times through the amplifying-filtering channel having a relatively broad band attenuation characteristic effectively to simulate, if desired, an amplifying-filtering channel of narrow frequency selectivity. The frequency-energy distribution of the signal is modified each time it traverses the filter by an amount proportional to the attenuation characteristics of the filter. If a plurality of records of different frequency characteristics are desired, the signal under the control of a preselector is photographically recorded after any one or all of the filtering cycles.

For a more detailed explanation of the invention and for objects and advantages thereof, reference may now be had to the following description taken with the accompanying drawings in which:

Fig. 1 diagrammatically illustrates a single-channel filtering-recording system;

Figure 4:
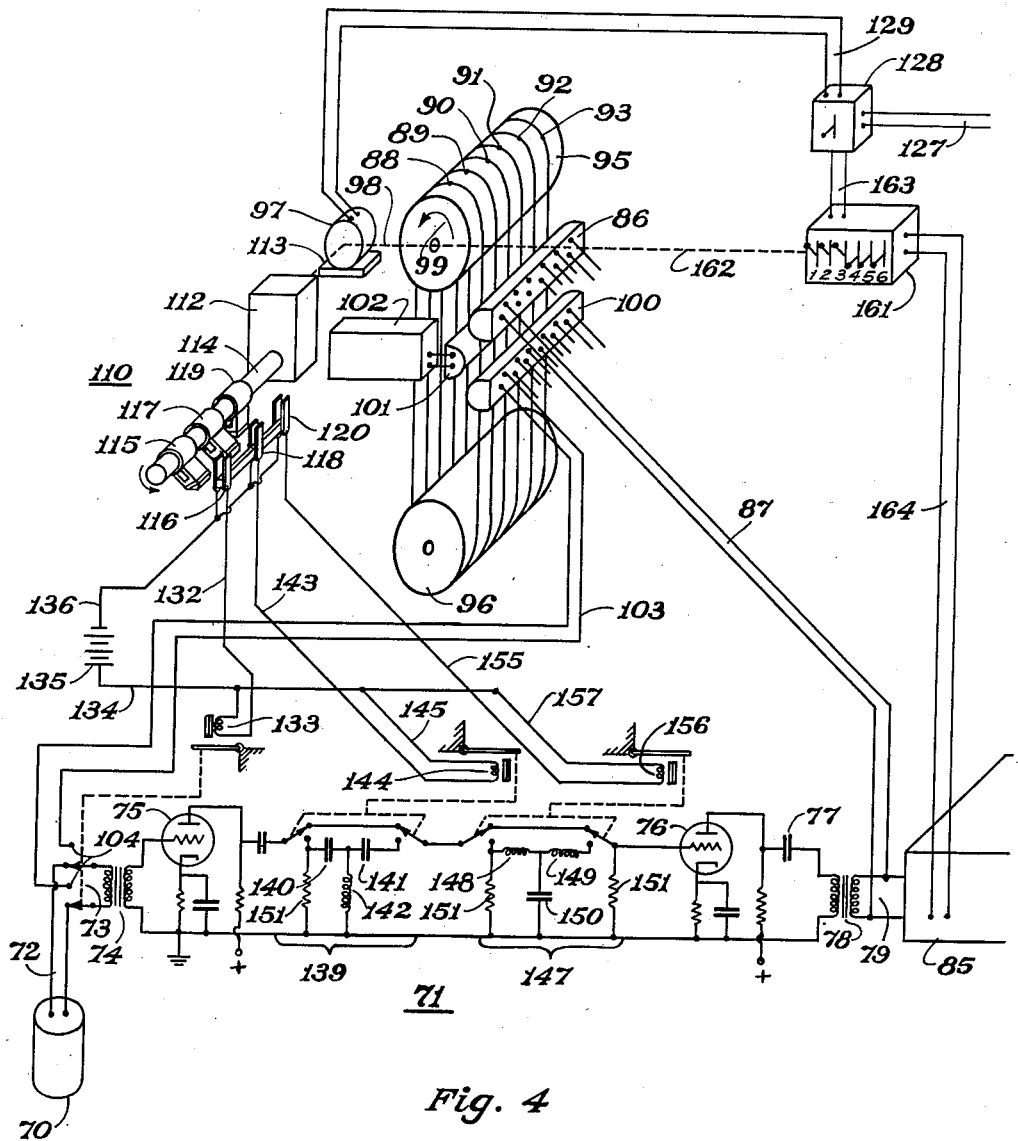
Figure 4A:
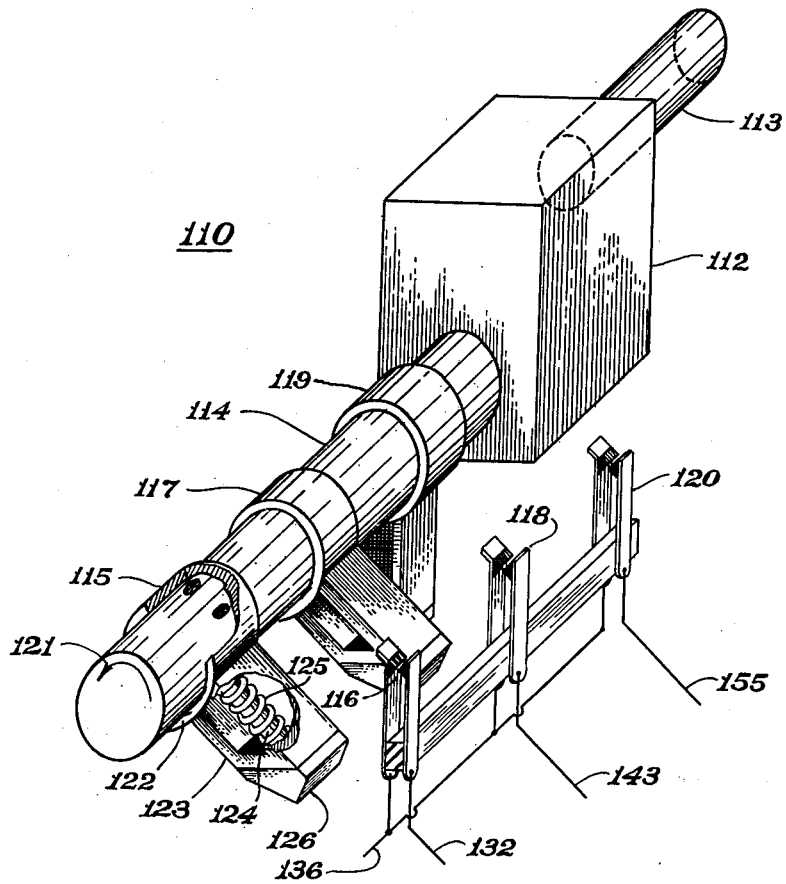

Fig. 4 diagrammatically illustrates a multi-channel filtering-recording system and includes a schematic diagram of the filtering channel;

Fig. 4a is an enlarged view of the control mechanism of Fig. 4; and

Figure 5:
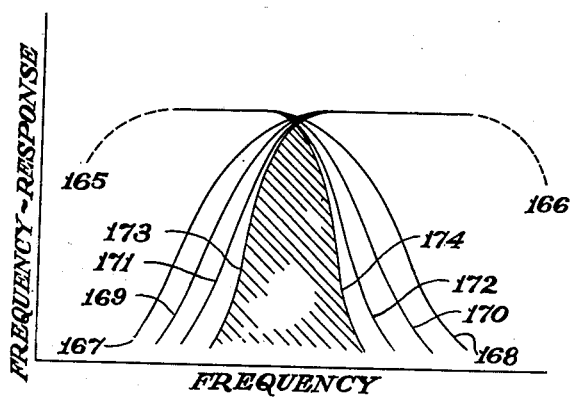

Fig. 5 is a graph of the frequency-response characteristics of the filtering channel of Fig. 4 for one mode of operation.

Figure 1:
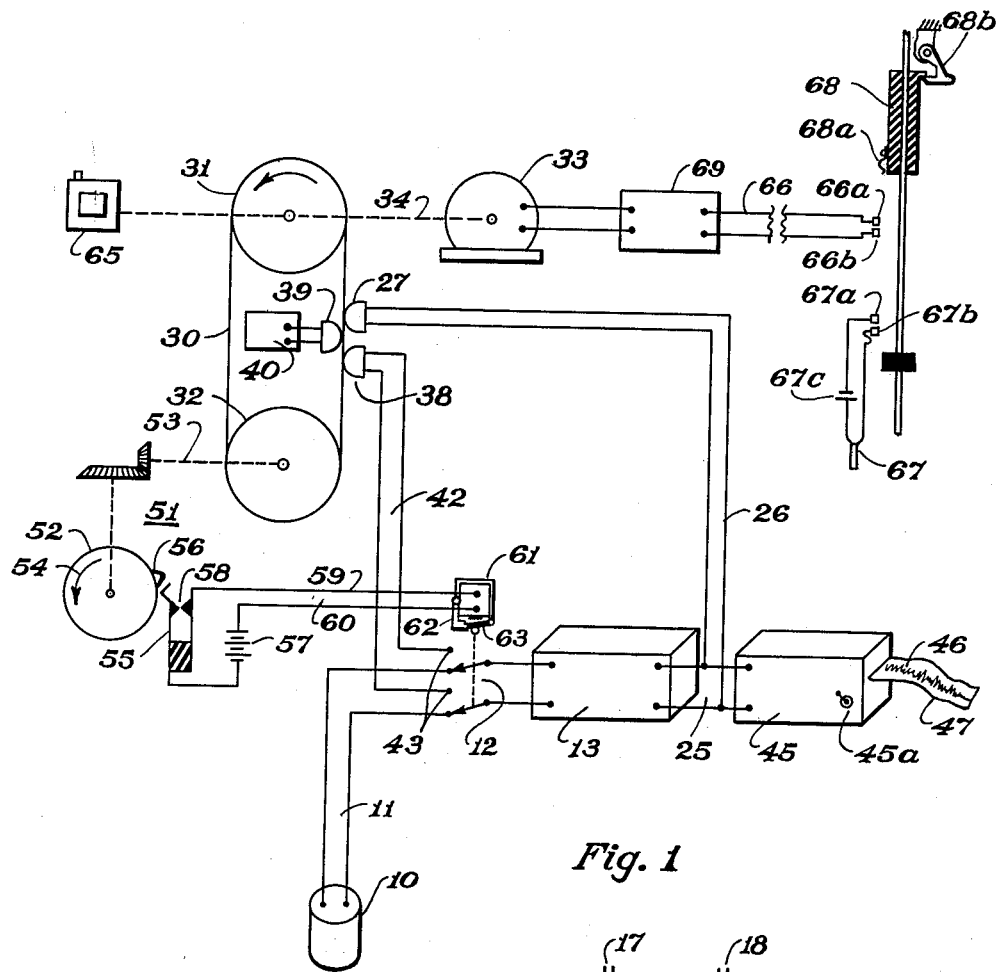

Referring now to Fig. 1, a system for recording earth vibrations or seismic waves in accordance with the present invention has been illustrated. Earth vibrations are detected by a vibration sensitive device such as a geophone 10 positioned at a predetermined location on the earth's surface with respect to a point at which seismic waves are generated. Electrical impulses generated in the geophone 10 are transmitted over conductors 11, through input selector switch 12 to an amplifier 13. The impulses are filtered as they traverse the amplifier 13. The impulses passing through the amplifier 13 are impressed upon an output circuit which includes a pair of conductors 25 connected to a conventional oscillographic recorder 45. The amplifier 13 is also connected to a circuit in parallel with the recorder 45 which includes a pair of conductors 26 connected to a transducer shown as a recording head 27.

A temporary receptor or signal-storing medium as, for instance, a magnetic wire or tape loop 30 is positioned in operative relation with respect to the recording heading 27. The endless magnetic loop 30 passing over vertically spaced rollers 31 and 32 is cyclically driven by a constant speed motor 33 mechanically coupled to the roller 31 as diagrammatically illustrated by coupling 34. When the motor 33 is energized from a suitable power source, the loop 30 moves past the recording head 27. The impulses generated by the geophone 10 after passing through amplifier 13 are stored on loop 30 and are also recorded by recorder 45.

Subsequently, an impulse stored on the wire loop 30 travels counter-clockwise from recording head 27 to a transducer shown as a magnetic pickup 38 which translates it into an electrical signal. Immediately thereafter the impulse is erased or obliterated by a transducer shown as an erasing head 39 energized from a source 40.

In accordance with the present invention the signal, as detected by the magnetic pickup 38, is then reapplied to the input of the amplifier 13. More particularly, conductors 42 connected to the magnetic pickup 38 are terminated at the switch contacts 43. A switching mechanism 51 operating at the end of the first complete rotation of the magnetic loop 30 energizes the relay 61 to connect the input selector switch 12 to the terminals 43. The latch 62 cooperating with armature 63 serves to hold switch 12 in contact with terminals 43 following energization of solenoid 61. Thereafter, the signal, detected as the loop 30 passes the magnetic pickup 38, will traverse the amplifier 13 and be again stored on the magnetic loop or magnetic medium 30 by recording head 27 for subsequent cycles of operations.

Figure 2:
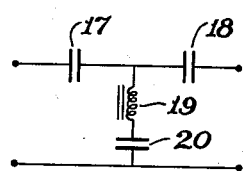
Fig. 2 is a schematic diagram of a high-pass filter.

By storing a plurality of times on the magnetic loop, the signal, as by a filter, may be modified by degrees progressively to emphasize impulses within a predetermined frequency band and to produce a plurality of primary seismic records from a single shot or to produce a single primary record having certain desired characteristics. More particularly, the filter may have any desired frequency-selective characteristic. For instance, it may be desirable to eliminate only the low-frequency ground roll noise components from the impulses generated by the geophone 10. A high-pass filter illustrated in Fig. 2 and comprising series condensers 17 and 18, shunt inductance 19 and shunt condenser 20 of proper value would be adequate to eliminate the undesired frequency components.

Figure 3:
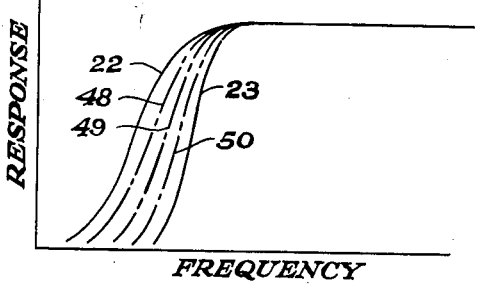
Fig. 3 is a graph including the frequency-response characteristic of the high-pass filter of Fig. 2.

The frequency-response characteristic of such a filter is plotted as curve 22 of Fig. 3. It is noted that the attenuation characteristic is not sharp. To obtain sharply resonant frequency characteristics a plurality of sections of the filter illustrated in Fig. 2 would be necessary, in which case the curve 23 could be approximated. In accordance with the present invention the curve 23 of Fig. 3 may be simulated utilizing the simple filter construction of Fig. 2. As illustrated in Fig. 3, the signal stored on the loop 30 for the first time will have been attenuated by an amount proportional to the response characteristic illustrated by line 22. When the signal has been stored the second time on the loop 30 it effectively has been filtered by a filter having a frequency-selective characteristic indicated by the broken line 48. The third time it is stored the effective response characteristic of the filter is illustrated as the dotted curve 49, the fourth time by the dotted curve 50, and the fifth time by the curve 23. Thus, by repeatedly storing and detecting the filtered or modified signal, within practical limits a filter of any desired selectivity may be simulated and, hence, any desired frequency-energy distribution may be obtained, or any desired degree of maximum emphasis of the selected frequency band may be attained.

Following any one or all of the refiltering operations, the signal may be photographically recorded, for instance as an undulating line or oscillograph trace. More particularly by actuating the paper or film driving mechanism of the recorder 45, the signal output of the amplifier 13 will be recorded as trace 46 on a photographic film or sensitized paper 47. The recorder 45 may be operated continuously or intermittently. The drive mechanism of the recorder 45 may be independently actuated as by switch 45a to permit an attendant or operator to select the number of refiltering operations to which the detected seismic signal is to be subjected before each recording or a final recording on the film 47.

In this system the motor 33 is energized in predetermined time relation with the initiation of the seismic waves. More particularly, conductors 66 connect a control unit, generically represented by block 69, to a blaster located at or near the point of detonation of the explosive charge. The control unit 69 may include a source of power for motor 33 or may control application of power thereto from a separate source. The conductors 66 are connected to contact posts 66a and 66b. Similar contact posts 67a and 67b are included in a circuit with detonating cap 67 and battery 67c. A plunger 68 carrying spring contact 68a is positioned to travel, upon release from latch 68b past the posts 66a, 66b, 67a and 67b momentarily to close circuit 66 and after a time interval, to close the circuit including the cap 67, thereby to energize the motor drive 33 and later to detonate the explosive.

In operation the blaster element 68 is released. Closure of the circuit 66 starts motor 33. Energization of the cap circuit detonates an explosive charge, initiating seismic waves. Thereafter, the geophone 10 generates electrical impulses in sympathy with arriving seismic waves. The impulses are impressed through the input selector switch 12 to the amplifier 13 where they are amplified and filtered. The impulses thus amplified are applied through circuits 25 and 26 to the recorder head 27 where they are stored on the magnetic loop 30. The length of loop 30 and the speed with which the loop travels are so related that the complete seismic event may be stored on the loop without overlapping of the beginning and end portions. For example, the period of one cycle of the loop may be four or five seconds which ordinarily would be of sufficient length to eliminate any overlapping of the seismic event in reflection studies. A loop correspondingly longer or a slower speed may be required in refraction studies. At the instant the motor 33 is energized, the input switching mechanism 51 begins operation. The cam wheel 52 operatively connected to the lower roller 32 by mechanical coupling 53 is initially positioned as illustrated in Fig. 1. The cam 52 then rotates in a direction indicated by the arrow 54. The ratio of the speed reduction in the coupling 53 between the roller 32 and the cam 52 is such that cam 52 will make one complete revolution for each complete cycle of the magnetic loop 30.

When the loop 30 has made one complete rotation and has the complete seismic event recorded thereon, the lever arm 55 controlled by the wedge portion 56 of the cam 52 closes a control circuit which includes battery 57, switch contacts 58, conductors 59 and 60, and the solenoid 61. Current flowing from the battery 57, when the switch 58 is closed, energizes the solenoid 61 to operate the input selector switch 12. This moves the contacts of switch 12 to the terminals 43 with latch 62 restraining armature 63 in its new position. Thereafter, impulses detected by the magnetic pickup 38 are applied through the input selector switch 12 of the amplifier 13. With the detector 38 thus connected to the input of the amplifier 13, the impulses once recorded or stored on the magnetic loop 30 may be refiltered and the refiltered impulses stored any number of times. By actuation of the recorder 45 at predetermined instants and for a length of time equal to the period of the seismic event, a plurality of records may be obtained from detonation of a single explosive charge. Each record produced is a modification of the one preceding it.

In areas where the frequency-energy distribution of the reflected seismic waves and the ground noise energy are closely adjacent in the frequency spectrum, circuits having a response characteristic illustrated by the curve 22 of Fig. 3 fail to delineate or separate the noise energy from the desired signal. By refiltering a plurality of times optimum results may be obtained.

The recorder 45 of Fig. 1 is controlled independently of the storing and refiltering mechanism. Though it may be preferable to effect control of the operation of recorder 45 through a suitable programming selector to make the system wholly automatic, as will be described later, the independent system has here been shown for the purpose of simplicity. In this system a counter 65 has been provided and is connected to the roller 31, or otherwise connected to the driving means or motor 33. If set at zero at the instant the explosive charge is detonated, the counter thereafter will read the number of recycling or refiltering operations to which the signal has been treated. The operator, in response to the indication of the counter 65, may actuate recorder 45 following any one, or all, of the refiltering operations as desired. For example, if the signal is to be treated as by a filter having a response curve 23 of Fig. 3, the operator would actuate the control switch 45a of the recorder 45 at the instant the counter 65 registered 4. In this case, the signal would have been stored and refiltered four times. Thereafter, in the fifth cycle of refiltering in the amplifier 13, the signal will be recorder as the trace 46. To prepare for the reception of a succeeding seismic event, the armature 63 is released connecting geophone 10 to the amplifier 13, the cam 52 is rotated to its starting position illustrated in Fig. 1, and the indicator 65 is set to zero.

In the foregoing description it will be seen that the use of a simple filter arrangement in conjunction with a cyclically reproduced and refiltered signal affords a means of recording seismic waves from a single shot or explosive charge in a manner that a plurality of records may be produced which differ in their composition one from the other by an amount proportional to the attenuation characteristic of the filter used. It is to be noted that the temporary receptor used to store the signals between refiltering cycles need not be a loop, though the arrangement as shown is the best and most advantageous form of the invention, since many of the problems encountered in the use of large spools of wire are avoided.

The system illustrated in Fig. 1 may be utilized to filter and record signals generated by a single geophone. It is to be understood that circuits and devices, not shown but well known in the art may be utilized to impress on the storing loop and/or the final record an index or a time break at the instant at which the explosive charge is detonated in the proper time relation with respect to the seismic event recorded on the photographic film 47.

Seismic exploration is generally carried out utilizing a plurality of geophones positioned at various predetermined distances from the point of generation of the seismic waves. The signals detected or generated by the geophones are amplified, filtered and recorded photographically, generally as galvanometer traces. Although there are modifications, a record is generally produced which has undulating lines, in number equal to the number of geophone locations, and oriented in parallel array throughout the length of the record produced.

The system illustrated in Fig. 4 may be utilized in accordance with the present invention to record a plurality of signals generated by the aforementioned plurality of geophones. In Fig. 4 one complete recording-filtering-amplifying channel has been illustrated, it being understood that for the six-trace system shown, like channels will be provided for the other five signals to be recorded. The control circuits, however, will be common to all amplifying channels.

Signals generated by geophone 70 are connected to the input of the amplifying-filter circuit 71 by conductors 72, input selector switch 73 and input transformer 74. The signals are impressed upon the grid of the tube 75 where they are amplified. For the circuit connections shown, the output of tube 75 is impressed directly upon the grid of tube 76. The amplified signals, through coupling condenser 77 and output transformer 78, are impressed on the output circuit 79. Signals thus amplified may be applied to and recorded directly by one of the elements of the multiple-element recorder 85. Simultaneously therewith, signals are impressed upon one channel of a tranducer shown as a magnetic recorder 86 by way of a circuit which includes one element of recorder 86 and conductors 87. The signal is there stored upon a temporary receptor or magnetic wire 88.

The filters between tubes 75 and 76 have been illustrated as a high-pass filter 139 and a low-pass filter 147 which may be independently switched in or out of the circuit. More particularly, the high-pass filter 139 includes series condensers 140 and 141 and shunt inductance 142. The low-pass filter 147 includes series inductances 148 and 149 and shunt condenser 150. The filters are terminated at each end by resistors 151.

In the system shown receptors are provided for signals from six amplifying channels. More particularly, the five additional magnetic loops 89-93 will be connected to channels similar to that shown for loop 88 and will likewise be connected to recording elements in the multiple-element recorder 85, it being understood that there is one temporary receptor and one recording element for each signal to be stored and recorded. The magnetic loops 88-93 are threaded over vertically spaced rollers 95 and 96. The roller 95 is mechanically connected to and driven by the motor 97 through the coupling 98. The direction of rotation is counter-clockwise as indicated by the arrow 99. A signal stored on temporary receptor or magnetic medium 88 travels through substantially a complete cycle to the point where it passes the multiple-element transducer shown as detector 100. Between the detector 100 and the recording head 86 is a transducer shown as an obliterating or erasing unit 101 supplied from a source of potential 102. The detector 100 is connected by conductors 103 to terminals 104 of the input selector switch 73. Means associated with the driving mechanism or motor 97 are actuated at predetermined instants with respect to the initiation of the seismic event to connect the input of the amplifier 71 to the detector 100.

A selector or programming device 110 may be utilized to operate the input selector switch 73 and to perform other programming functions later to be described. A speed reduction drive 112 coupled to the motor 97 by the shaft or coupling 113 rotates shaft 114 at a speed proportional to the velocity of the storing elements 88-93. In the embodiment shown in Fig. 4, the shaft 114 carries commutating devices 115, 117, and 119. Upon rotation of shaft 114 the commutating devices close associated control circuits. More particularly, contacts 116 are controlled by element 115, contacts 118 are controlled by element 117 and contacts 120 are controlled by element 119.

The instant at which the commutating elements close the respective switches or circuits may be individually controlled. One manner in which such operation may be accomplished as illustrated in Fig. 4a which is an enlarged view of the programming device 110 of Fig. 4. As illustrated, the commutators 115 and 117 are positioned at an angle of 45° below the horizontal. The commutator 119 lags commutator 115 and 117 by 45°. Upon rotation of the shaft 114 in the direction indicated by the arrow 121, contacts 116, 118 and 120 will be closed in an ordered sequence. The interval between closure may be controlled by adjusting the relative positions of the commutating elements.

The commutator 115 comprises an annular portion 122 and a rectangular portion 123 forming an integral unit. A piston or a plunger 124 fitted in the rectangular portion 123 and biased by a spring 125 may be inserted into holes spaced about the periphery of the shaft 114. Such holes, shown in the portion broken away from the annular section 122 of the commutator 115 are spaced 45° apart. The cap 126 of insulating material is fastened to and carried by the piston or plunger 124. To vary the positions of the commutators, a force is applied to the cap 126 removing the plunger 124 from one of the holes. The commutating device is then rotated to the desired position where the piston is released. The commutators 117 and 119 are similarly constructed for like operation.

In Fig. 4, the contacts 116 control operation of the input selector switch 73. The contacts 116 are in a circuit which includes conductor 132, relay coil 133, conductor 134, battery 135 and conductor 136. In a similar manner, contacts 118 control a filter selector switch in the amplifier channel. The contacts 118 are in a circuit including conductor 143, relay coil 144, conductors 145 and 134, battery 135 and conductor 136. Energization of the relay coil 144 operates switches for filter 139 so as to include filter 139 in the circuit between tubes 75 and 76. Contacts 120 in circuit with conductor 155, relay coil 156, conductors 157 and 134, battery 135 and conductor 136 serve to energize the coil 156 to switch filter 147 into the circuit between tubes 75 and 76.

In the modification illustrated, there should be such a reduction in speed in the speed reducer 112 so that shaft 114 would rotate 45 degrees for one complete rotation of the storing elements 88-93. Thus, for the positions of the contacts illustrated in Figure 4, at the end of one complete rotation of the storing elements the commutator 115 will close contacts 116 energizing the relay coil 133. This action changes connections to the input transformer 74 from the geophone 70 to the terminals 104. Thus, the output of the detecting head 100 is applied to the amplifying channel. At the same time, the commutator 117 closes contacts 118 which energizes relay coil 144. This action inserts the low-pass filter 139 into the amplifying channel. At the end of the second complete rotation of the storing elements, the commutator 119 closes contacts 120 to energize the relay coil 156. This inserts the high-pass filter 147 into the amplifying channel. It is to be noted that, as above explained, during passage of an incremental length of the storing elements 88-93 past units 100, 101, and 86 the signal is first detected, then erased and a modified signal restored on that length.

As the signals are stored on the elements 88-93, they may be recorded simultaneously at the recorder 85. In cooperation with the program selector 110, the recorder 85 may be controlled automatically to record the signal at predetermined times. Such a control has been generically illustrated as a control box 161. The control 161 is coupled to the motor 97 by the shaft 162. Its operation is such that prior to any recording operation the switches 1-6 may be positioned to energize the motor driving recorder 85 during any one or all of the recycling operations controlled by the program selector 110. As illustrated, switches 1-3 are in the ON position. This means that for the first three complete revolutions of the storing elements 88–93, the recorder 85 will run continuously and will thus record the seismic event three times as a photographic record. The motor or drive in the recorder 85 may be energized from the line 127 through line 163, control unit 161, and line 164. Similarly, the motor 97 may be supplied from source 127 through the switch 128 and circuit 129.

For a complete operation or set of operations, assume that it is desired to record at recorder 85 first a record of the unfiltered, detected signal, second a record of the detected signal with the low frequencies substantially removed, and third a record having both the low frequencies and the very high frequencies removed. For such operation, the commutators 115, 117, and 119 initially would be positioned as illustrated in Fig. 4. Thereafter, in coordination with operations at the point of detonation and upon a pulse therefrom, the motor 97 is energized from the supply circuit 127 by closing the switch 128. The motor 97 drives the loops 88–93 in a counter-clockwise direction. Signals generated by the geophone 70 pass through the amplifier 71 and are impressed on the recording head 86. At the same time, the shaft 114 is rotated in a counter-clockwise direction. When the loops 88–93 have made substantially a complete revolution and have impressed thereon the complete seismic event, contacts 116 and 118 simultaneously are closed by their respective commutators 115 and 117 to connect the input transformer 74 to the detecting head 100 and to insert the low-pass filter 139 into the circuit. During the first revolution, the circuit including conductors 164 is energized, thereby to record at 85 the unfiltered signal from geophone 70. During the second complete revolution of the loops 88–93, the signal is amplified and filtered and is again impressed on the recorder 85 and stored on the loop 88. At the end of the second cycle, contacts 120 are closed by the commutator 119 to insert the low-pass filter 147 into the circuit. Thereafter, during the third cycle, the re-filtered signal is recorded by recorder 85.

To prepare for a succeeding record, the program selector 110 is positioned as illustrated in Fig. 4, the input transformer 74 is connected to geophone 70 and the switches for filters 139 and 147 are positioned as illustrated.

The programming arrangement illustrated is particularly useful in certain types of exploration. As above explained, where the multiple-element recorder 85 is operated continuously following detonation of the explosive charge, a first record will be produced simultaneously with the storing of the signal on the magnetic loop for the first time. This first record will represent the ground motion undistorted by selective filtering. The signals recorded will be the summation of the ground roll, refracted waves and all reflected waves. A second record produced will be a modification of the first to the extent that low-frequency ground roll is eliminated by the high-pass filter 139.

The filter 139 may be constructed to effect cutoff at any desired frequency within the seismic band as, for instance, at or near 40 c. p. s. The second record thus produced would then consist essentially of reflected energy. Further to refine and clarify the record, the insertion of the low filter eliminates certain undesired high-frequency components which may mask or distort the reflected energy. Thus, from detonation of a single explosive charge three records are produced, each a modification of the preceding one, and each containing valuable information as regards the interpretation thereof in the delineation of the sub-surface boundaries from which energy is reflected.

A second variation of programming may be understood by referring to the attenuation curves illustrated in Fig. 5. Assume that a first record is made by recorder 85 which contains undistorted ground motion, and that thereafter it is desired to obtain one or more records after the signal has been filtered by a band-pass filter whose band width is relatively narrow. This may be accomplished by adjusting the commutators 117 and 119 to actuate solenoids 144 and 156 at either the beginning or the end of the first complete revolution of the magnetic loops 88–93. Assume that the solenoids 144 and 156 are actuated at the end of the first cycle and that the recorder 85 is energized photographically to record the signals the first time they pass through the amplifier and following the fifth time they pass through the amplifier.

Referring to Fig. 5 the overall response characteristic of the amplifier is illustrated as the curve 165–166. The response characteristic of the amplifier channel with the high-pass filter in the circuit may be taken as the curve 167–166. The overall response characteristic of the channel with the low-pass filter alone in the circuit is represented by the curve 165–168. The signal recorded by recorder 85 as it is simultaneously stored on the loops 88–93 on the first cycle will have been modified by an amount proportional to the response curve 165–166, which for all practical purposes is a negligible modification. At the end of the first revolution of the loops commutators 115–117 and 119, having been rotated 45 degrees, close all three control circuits, actuating the solenoids 133, 144 and 156. Such action connects the detector 100 to the amplifier input and switches the low-pass filter 147 and the high-pass filter 139 into the circuit. The signal picked up by detector 100 will, in the second cycle, be modified by an amount proportional to the response curve 167–168. At the end of the third cycle the signal effectively will have been modified by an amount proportional to the curve 169–170; at the end of the fourth cycle, by an amount proportional to the curve 171–172; and at the end of the fifth cycle the signal will have been modified by an amount proportional to the response curve 173–174. A photographic record may be made after any one of the filtering cycles effectively to obtain band-pass filtered treatment. The selectivity of the effective band-pass filter may be varied by merely controlling the number of times the signal traverses the filter channel.

The wide variation in the level or amplitude of the seismic signals requires suitable control of the gain of the amplifying channel to assure signals at the recorder 85 of optimum level for ease of interpretation of the resulting record. A control system such as shown and described in prior patent to Minton et al. 2,301,739, "Gain Control For Amplifiers," or to Shimek et al. 2,420,571, "Gain Controlling System For Seismographs," will be suitable to provide adequate control. It is to be understood that the schematic diagram of amplifier of Fig. 4 is merely exemplary. It is one which may be modified by the teaching of the above prior art patents without departing from the spirit of the present invention.

It is obvious that various modifications of the foregoing technique may be utilized. For instance, filters of various selectivities may be switched into or out of the circuit following any one cycle of operations to change the response characteristic from record to record in any desired manner. In each case several records may be obtained from a single shot, each of which differs from the other by an amount proportional to the attenuation characteristic of the filtering arrangement inserted in the circuit between cycles.

It is to be understood that to produce a six-trace record from the recorder 85, five additional amplifying-filtering channels would be provided and connected to five additional geophones and to the five recording channels in the recording head 86. The programming circuits, however, would be common to all six amplifying channels, in which case actuation of solenoid 133 would change the input selector switch on each of the six amplifiers from its geophone input connection to its circuit connected to an element of detector 100. Likewise, the solenoid 144 would actuate the switches controlling the high-pass filters in each of the six amplifying channels, and the solenoid 156 would actuate the switch controlling each of the low-pass filters.

Though the invention has been illustrated and described in such detail as to enable those skilled in the art to practice the method and construct the apparatus described, it is to be understood that further modifications may now be made, all within the scope of the appended claims.

What is claimed is:

1. A seismic prospecting system for recording seismic waves which comprises a plurality of geophones spaced one from the other for generation of electrical impulses corresponding with seismic waves received thereby, amplifying-filtering channels to which said geophones are respectively connected for application to said channels of said impulses, temporary storing mediums respectively connected to the outputs of said channels temporarily to receive said impulses, means respectively associated with said temporary storing mediums for detecting said impulses, a selector actuated in timed relation with the initiation of said seismic waves to apply said detected impulses to said amplifying-filtering channels and to modify in predetermined sequence the response characteristics of said amplifying-filtering channels, and means associated with the outputs of said amplifying-filtering channels for recording said impulses at a predetermined time.

2. A seismic prospecting system, for recording seismic waves, which comprises a plurality of geophones spaced one from the other for generation of electrical impulses corresponding with seismic waves received thereby, amplifying-filtering channels to which said geophones are respectively connected for application to said channels of said impulses, temporary storing mediums respectively connected to the outputs of said channels temporarily to store said impulses, means respectively associated with said temporary storing mediums for detecting said impulses, a selector actuated in timed relation with the initiation of said seismic waves to apply said detected impulses to said amplifying-filtering channels and to modify in predetermined sequence the response characteristics of said amplifying-filtering channels, a multiple-element recorder associated with the outputs of said channels, and means operable at predetermined times for actuating said multiple-element recorder to produce upon each actuation a multiple trace record.

3. A seismic prospecting system comprising a geophone for converting seismic waves into electrical impulses, means for phonographically storing said impulses during the time interval of appearance of said waves, means for progressively modifying the frequency-energy distribution of said impulses to emphasize impulses within a predetermined frequency band within the range of from 30 cycles per second to 80 cycles per second comprising (a) a detector for detecting said stored impulses, (b) a filter for attenuating the frequency-energy distribution of said impulses, and (c) a circuit for transmitting said modified impulses to said storing means, said detecting means again being effective to apply said modified impulses to said filtering means, a recorder having an input circuit upon which said modified impulses are impressed, and means for actuating said recorder to record modified impulses.

4. A seismic prospecting system comprising a geophone for converting seismic waves into electrical impulses, means for phonographically storing said impulses during the time interval of appearance of said waves, means for progressively modifying the frequency-energy distribution of said impulses to emphasize impulses within a predetermined frequency band within the range of from 30 cycles per second to 80 cycles per second comprising (a) a detector for detecting said stored impulses, (b) a filter for attenuating the frequency-energy distribution of said impulses, and (c) a circuit for transmitting said modified impulses to said storing means, said detecting means again being effective to apply said modified impulses to said filtering means, a recorder, and means operable simultaneously (1) with translation of said seismic waves into electrical impulses and (2) upon detection of said stored impulses after different degrees of frequency-energy modification thereof to actuate said recorder to record said impulses to produce a plurality of seismograms from a single sudden release of acoustical energy, each seismogram differing from the other by a differing frequency-energy distribution.

5. A signal treating and recording system which comprises an endless cyclically-moving storing medium having a signal-reproducing head, a signal-obliterating means and a signal-recording head positioned sequentially along the travel path thereof, a signal channel having a predetermined frequency-amplitude response and input and output terminals, circuit means for connecting said output terminals to said recording head, a recorder connected to said output terminals, means for applying a signal to said input terminals for storage on said medium during a first cycle thereof, means operable in synchronism with said storing medium for connecting said signal-reproducing head to said input terminals at the end of said first cycle to form an electromechanical feedback loop, and means operable at the end of a selected succeeding cycle of said storing medium for actuating said recorder to record said signal after plural passage through said signal channel.

6. A signal treating and recording system which comprises an endless cyclically-moving storing medium having a signal-reproducing head, a medium having a signal-reproducing head, a signal-obliterating means and a signal-recording head positioned sequentially along the travel path thereof, a plurality of filter means having differing amplitude-frequency characteristics, a signal channel having input and output terminals and a predetermined amplitude-frequency response with switching means for insertion of selected ones of said filter means into said channel to modify said response, circuit means for connecting said output terminals to said recording head, a recorder connected to said output terminals, means for applying a signal to said input terminals for storage on said medium during a first cycle thereof, means actuated at the end of said first cycle for connecting said signal-reproducing head to said input terminals to form an electromechanical feedback loop, means for energizing said switching means at the end of selected cycles of said medium for insertion into said channel of said selected filter means, and means operable following predetermined cycles of movement of said medium for actuating said recorder to record said signal after filtering by plural passage through said channel.

7. In a seismic exploration system where seismic waves are generated following detonation of an explosive charge, a traveling signal storing loop having a period substantially equal to the duration of said seismic waves, a detector for generating signals responsive to said waves, amplifying-filtering means having output terminals and input terminals connected to said detector, a recorder connected to said output terminals, a first transducer connected to said output terminals and positioned at a first point along the travel path of said loop for storage of said signals thereon, a second transducer in signal-detecting relation to said loop at a point in said travel path beyond said first transducer, signal-obliterating means beyond said second transducer, means operable in predetermined time relation to the generation of said seismic waves for disconnecting said detector from said input terminals and for connecting said second transducer thereto for repeated passage of said signal through said amplifying-filtering channel, and means operable in predetermined time relation with said generation for actuating said recorder for recording said signals after a predetermined number of passes through said amplifying-filtering channel.

8. A system for recording impulses generated by a vibration sensitive device in response to seismic waves which comprises an amplifying-filtering channel for filtering said impulses, a magnetic recording head connected to the output of said channel, a traveling magnetic medium movable relative to said head for storing thereon said impulses from said channel, a detector positioned later in the travel of said magnetic medium to detect said stored impulses, means associated with said magnetic medium and positioned later in the travel path of said medium than said detector for obliteration of stored impulses, a switch actuated at a predetermined time with respect to the travel of said magnetic medium to connect said detector to the input of said amplifying-filtering channel thereby to permit a plurality of cycles of detection, obliteration, filtering, and storing and re-storing of said impulses, a recorder connected to the output of said amplifier for photographically recording said impulses, and means for actuating said recorder after a predetermined number of filtering cycles.

9. A system for recording impulses generated by a vibration sensitive device in response to seismic waves which comprises an amplifying-filtering channel for filtering said impulses, a magnetic recording head connected to the output of said channel, a traveling magnetic medium movable relative to said head for storing thereon said impulses from said channel, a detector and an erasing head positioned one after the other along said magnetic medium and later in its travel path than said recording head for respectively detecting said stored impulses and then for obliterating them on said magnetic medium, a switch actuated at a predetermined time with respect to the travel of said magnetic medium to connect said detector to the input of said amplifying-filtering channel thereby to permit a plurality of cycles of detection, obliteration, filtering, and storing and re-storing of said impulses, a recorder connected to the output of said amplifier for photographically recording said impulses, and means for actuating said recorder after a predetermined number of filtering cycles.

JOHN P. MINTON.

References Cited in the file of this patent
UNITED STATES PATENTS

| Number | Name | Date |
| --- | --- | --- |
| 1,910,254 | Keller | May 23, 1933 |
| 2,072,527 | Nicolsen | Mar. 2, 1937 |
| 2,378,383 | Arndt, Jr. | June 19, 1945 |
| 2,378,388 | Begun | June 19, 1945 |
| 2,378,389 | Begun | June 19, 1945 |
| 2,394,990 | Eisler et al. | Feb. 19, 1946 |
| 2,429,236 | Potter | Oct. 21, 1947 |
| 2,427,421 | Rieber | Sept. 16, 1947 |
| 2,439,446 | Begun | Apr. 13, 1948 |
| 2,521,635 | Kornei | Sept. 5, 1950 |